REED RELAY SCANNER WITH TRANSIENT SUPPRESSION

Filed June 24, 1968 2 Sheets-Sheet 1

INVENTOR
RICHARD O. TRAINA

BY Harry G. Shapiro
ATTORNEY

REED RELAY SCANNER WITH TRANSIENT SUPPRESSION

Filed June 24, 1968 2 Sheets-Sheet 2

INVENTOR
RICHARD O. TRAINA

BY Harry G. Shapiro
ATTORNEY

United States Patent Office 3,519,840

Patented July 7, 1970

3,519,840

REED RELAY SCANNER WITH TRANSIENT SUPPRESSION

Richard O. Traina, Randolph Township, N.J., assignor to Plessey Airborne Corporation, Hillside, N.J., a corporation of New Jersey Filed June 24, 1968, Ser. No. 739,248
Int. Cl. H04b *15/00*
U.S. Cl. 307—93 9 Claims

ABSTRACT OF THE DISCLOSURE

Ten position multiplexer for the sequential connection of ten independent variables to a common output. A scanning oscillator drives a ten position SCR ring counter for operating a reed relay matrix. A transient suppression circuit connected to the matrix output includes a capacitor connected across the output terminals and having a discharge circuit controlled by a reed relay operated synchronously with the relay matrix.

BACKGROUND OF THE INVENTION

This invention relates to multiplexer apparatus, and more particularly to apparatus for the sequential connection of a plurality of signal input circuits to a common output circuit at which the signals may be controlled or monitored or may operate control or alarm circuits.

Prior multiplexers for accomplishing the purposes of the present invention have in general been unduly complex and expensive, and/or unreliable. For example, it has heretofore been proposed to provide a pair of binary counters for operating an X–Y reed relay matrix, but the switching apparatus is quite complex. Moreover, prior multiplexer apparatus incorporating transient suppression has required the complexity of amplification circuits, for example.

BRIEF DESCRIPTION OF THE INVENTION

It is accordingly a principal object of the present invention to provide improved multiplexer apparatus of high reliability yet reasonable cost.

Another object of the invention is to provide time-division multiplexer apparatus having reliability approaching that of completely solid-state systems but without the attendant cost, and having a much higher degree of reliability than comparably priced mechanical systems.

Another object of the invention is to provide multiplexer apparatus which incorporates a simple transient suppression circuit, thus avoiding the problems which are usually inherent in the switching of mechanical contacts.

A further object of the invention is to provide a novel transient suppression circuit.

Briefly stated, the present invention is concerned with a system which, in a preferred embodiment, includes a solid-state ring counter for operating a reed relay matrix to connect a plurality of input circuits to a common output circuit sequentially, the ring counter being advanced by a scanning oscillator. A transient suppression circuit is interposed between the relay matrix and the output circuit and is operated by a monostable multivibrator triggered by the scanning oscillator in synchronism with the operation of the ring counter. The transient suppression circuit causes the level of the signal at the output circuit to vary gradually from the signal level of one input circuit to the next irrespective of the abruptness of the change of signal level as the system switches from one input circuit to the next.

BRIEF DESCRIPTION OF THE DRAWINGS

The foregoing and other objects, advantages, and features of the invention and the manner in which the same are accomplished will become more readily apparent upon consideration of the following detailed description of the invention in conjunction with the accompanying drawings, which illustrate a preferred and exemplary embodiment, and wherein.

DETAILED DESCRIPTION OF THE INVENTION

Figure 1:
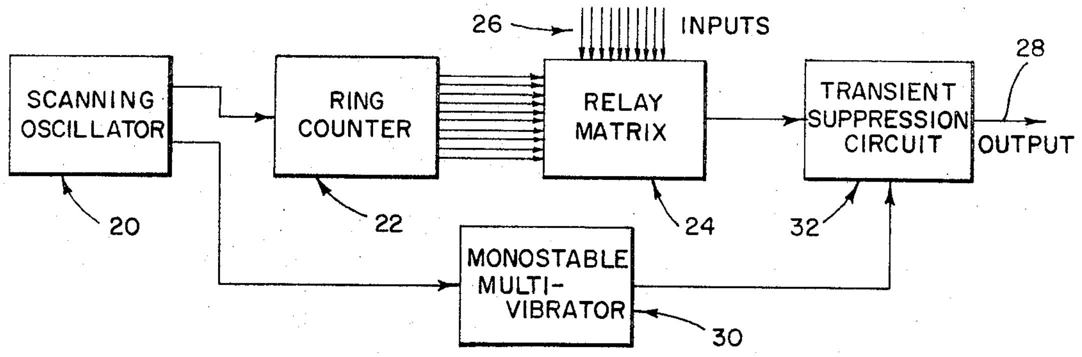
FIG. 1 is a block diagram illustrating a system in accordance with the invention.

Referring to the drawings, and initially to FIG. 1 thereof, in the illustrative form the apparatus of the invention comprises a scanning oscillator 20 which supplies pulses for advancing a ring counter 22, which controls a reed relay matrix 24 for successively connecting inputs 26 to a common output 28. In the form shown ten independent variables represented, for example, by DC signals at the inputs 26, respectively, may be connected to the common output 28, at which the variables may be controlled or monitored or may operate control or alarm circuits (not shown), for example. The scanning oscillator 20 may be a conventional free-running unijunction relaxation oscillator, and the ring counter may be a conventional ten-position silicon controlled rectifier type. Relay matrix 24 may include conventional reed relays (magnetic reed contacts enclosed in an evacuated envelope and actuated by a coil) wired in a ten-position single-pole, single-throw, normally open switching matrix configuration. The reed relays, while highly reliable and less costly than solid-state relays, tend to generate switching transients when their contacs are operated. In order to prevent the transmission of such transients to the equipment attached to the output circuit 28, a monostable multivibrator 30 and transient suppression circuit 32 are provided. Multivibrator 30 is also driven by the scanning oscillator 20 and operates synchronously with the operation of the ring counter 22 so as to actuate the transient suppression circuit 32 each time the relay matrix 24 transfers the connection of the output 28 from one input 26 to the next. Details of the operation of the transient suppression circuit will be given hereinafter.

Figure 2:
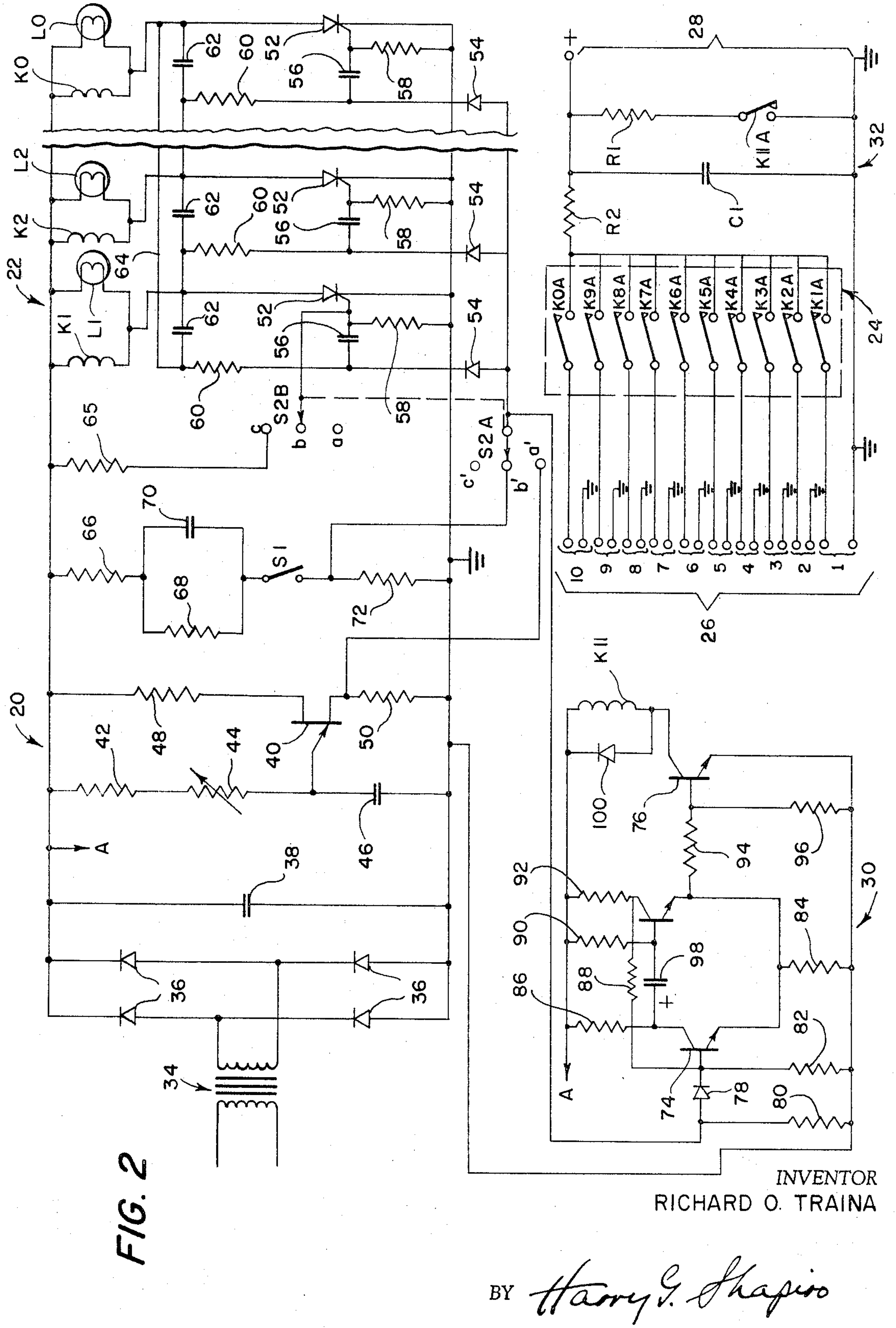
FIG. 2 is a schematic diagram of the system of FIG. 1.

FIG. 2 illustrates the system of FIG. 1 in greater detail. The reference numerals employed in FIG. 1 to designate the major blocks of the system have also been applied to FIG. 2 to facilitate an understanding of the latter. As shown, the system may comprise a power supply including a power transformer 34, a full-wave rectifier having four diodes 36, and a filter capacitor 38. Terminal A shown adjacent to the capacitor 38 is connected to the identically designated terminal associated with the monostable multivibrator 30 for supplying electrical power thereto. The scanning oscillator 20 comprises the unijunction transistor 40, resistors 42 and 44 and capacitor 46, which determine the sampling rate (resistor 44 being variable to adjust the rate), and resistors 48 and 50 connected to base two and base one of the unijunction, respectively.

The ring counter 22 includes ten identical stages (three of which are shown), each having an SCR 52, the gate electrode of which is connected to the output of the scanning oscillator through a diode 54 in series with a capacitor 56. Resistors 58 are connected from the gate electrodes to the grounded or earthed side of the power supply. Each SCR is connected in series with the actuating coil (K1, K2 . . . K0) of a reed relay in parallel with a numerical indicator lamp (L1, L2 . . . L0). The ring counter stages also include resistors 60 and capacitors 62. The last stage is connected to the first stage by conductor 64 in the usual manner.

Switch S2A–S2B is a two-pole, three-position mode selector switch. This switch is spring-returned to position *b–b'* after being manually moved to position *c–c'* in order to connect the gate electrode of the SCR of the first stage of the ring counter to the output of the full-wave rectifier through a resistor 65, and thus to turn on the first stage of the ring counter. When the switch returns to position *b–b'*, the ring counter may be advanced manually by repetitive closing of normally open switch S1, thereby to supply advancing pulses to the ring counter from a network including resistor 66, resistor 68 and capacitor 70 in parallel, and resistor 72. When switch S2A–S2B rests in position *a–a'*, advancement of the ring counter is automatic in response to pulses supplied from base one of the unijunction 40 of scanning oscillator 20.

The monostable multivibrator 30 is per se a conventional circuit including a pair of transistors 74 and 76, the base of the former being connected to the blade of switch S2A through a rectifier 78. The multivibrator circuit also includes resistors 80, 82, 84, 86, 88, 90, 92, 94, and 96, capacitor 98, and a protective diode 100 connected across the coil K11 of another reed relay.

The inputs 26 comprise pairs of terminals numbered 1 through 10, each pair including a grounded or earthed terminal and a terminal connected to a switch associated with one of the reed relay coils K1 . . . K0, the corresponding switches being designated K1A . . . K0A. The switches have one contact connected in common to one of the pair of output terminals 28. The transient supression circuit comprises a capacitor C1, a discharge circuit including a resistor R1 in series with a switch K11A controlled by coil K11, and a charging resistor R2.

From the foregoing description it will be apparent that each time the scanning oscillator 20 supplies a pulse to the ring counter, the ring counter will advance to the next stage and will energize the associated reed relay, the contacts of which will close to connect the associated input circuit to the output circuit 28. The closing of the contacts of each reed relay and the concurrent opening of the contacts of the preceding relay will be likely to generate switching transients highly disruptive to the circuitry normally connected to the output 28. The transient suppression circuit 22 operates to prevent this condition, as follows:

When the scanning oscillator signals the ring counter to advance, it also triggers the monostable multivibrator 30. The monostable multivibrator has a nominal period of ten milliseconds, for example. This means that upon receipt of a pulse from the scanning oscillator, the multivibrator will switch to its quasi-stable state and will remain there for ten milliseconds. At the end of this period it will return to its stable state. When the monostable multivibrator is in its quasi-stable state, it energizes reed relay coil K11, which closes switch K11A and completes a discharge circuit for capacitor C1 through resistor R1. At the end of the ten millisecond period, relay coil K11 is de-energized and switch K11A opens, interrupting the discharge circuit for capacitor C1.

Figure 3:
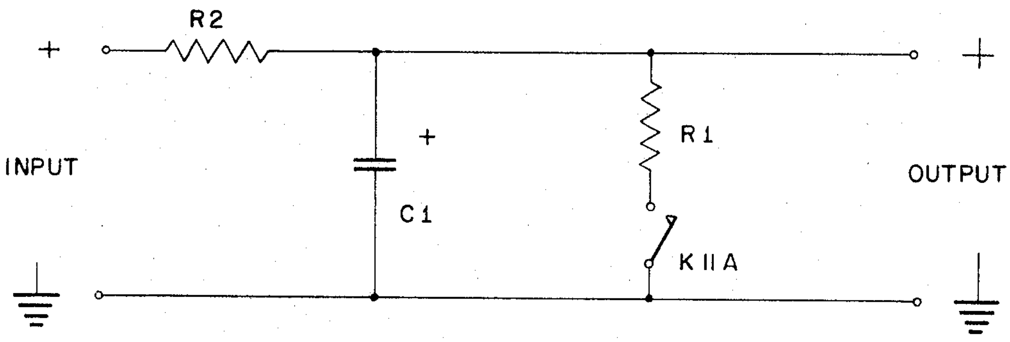
FIG. 3 is a schematic diagram of a transient suppression circuit employed in the invention.
Figure 4:
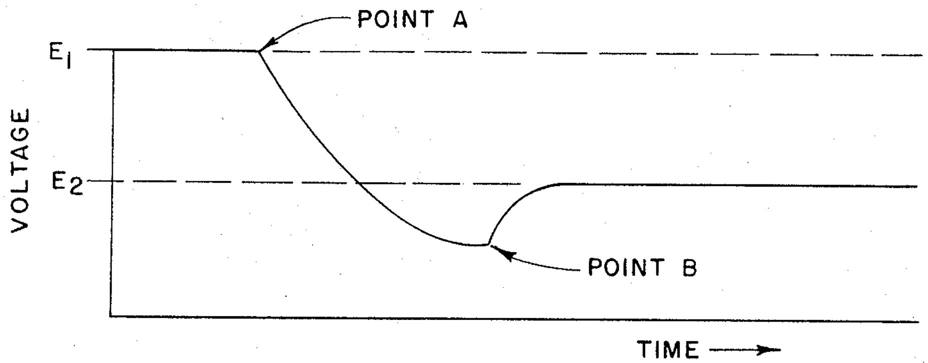
FIG. 4 is a graph illustrating the operation of the transient suppression circuit.

Thus, referring to FIGS. 3 and 4, prior to the switch transfer signal from the scanning oscillator, the output voltage is stable at input voltage $E_1$, and capacitor C1 is charged to this voltage. When K11A closes, at point A (matrix transfer point), capacitor C1 discharges through resistor R1 along a 100 microsecond time constant curve, for example, shown extending downwardly from point A. When K11A opens, at point B (ten milliseconds after point A), the output rises smoothly to the value of the new input voltage $E_2$, due to the charging of capacitor C1 through resistor R2 along a 100 microsecond time constant curve, for example, as shown. The voltage across capacitor C1 cannot change in a discontinuance manner. Hence as the system is switched from one input circuit to the next, the output voltage must vary smoothly from the value of one input signal to the next irrespective of the abruptness of the change in signal level or the generation of transients. Switching transients at the output are thus avoided.

In an illustrative circuit, the following components and component values may be employed:

| Component: | Type or Value |
|---|---|
| 36 | CER–67A. |
| 38 | 200 mfd., 25 v. |
| 40 | 2N2646. |
| 42 | 5.1K. |
| 44 | 50K. |
| 46 | 20 mfd., 10 v. |
| 48 | 1.3K. |
| 50 | 51 ohms. |
| 52 | C106Y2. |
| 54 | TW–5. |
| 56 | 0.01M. |
| 58 | 150 ohms. |
| 60 | 36K. |
| 62 | 0.47 mfd. |
| 65 | 1000 ohms. |
| 66 | 100 ohms. |
| 68 | 1M. |
| 70 | 0.1 mfd. |
| 72 | 51 ohms. |
| 74, 76 | 2N3395W. |
| 78 | 1N914. |
| 80 | 1K. |
| 82 | 10K. |
| 84 | 200 ohms. |
| 86 | 2.2K. |
| 88 | 51K. |
| 90 | 180K. |
| 92 | 2.2K. |
| 94 | 36K. |
| 96 | 3.9K. |
| 98 | 0.1 mfd. |
| 100 | TW–5. |
| C1 | 1 mfd., 12 v. |
| R1, R2 | 100 ohms. |
| K1–K1A . . . K0–K0A | SPST, N.O. 14 VDC reed relays. |
| L1 . . . L0 | 14 VDC, 80 ma numerical indicators. |

While a preferred embodiment of the invention has been shown and described, it will be apparent to those skilled in the art that changes can be made in this embodiment without departing from the principles and spirit of the invention, the scope of which is defined in the appended claims. For example, the transient suppression circuit may be actuated slightly before the matrix transfer point and still be actuated substantially concurrently therewith.

I claim:

1. Multiplexer apparatus comprising a plurality of signal input circuits, a signal output circuit, switching means for successively connecting said input circuits to said output circuit, means for operating said switching means, and transient suppression means connected between said switching means and said output circuit, said transient suppression means comprising means operated substantially concurrently with the operation of said switching means for causing the level of the signal at said output circuit to vary gradually from a signal level corresponding to that of an input circuit connected to said output circuit prior to operation of said switching means to another signal level corresponding to that of an input circuit connected to said output circuit after operation of said switching means and irrespective of the abruptness of the change in input signal level.

2. The apparatus of claim 1, and wherein said transient suppression means comprises means for causing the output signal level to change from one signal level to another within a predetermined period of time.

3. The apparatus of claim 1, and wherein said switching means comprises a relay matrix.

4. The apparatus of claim 1, and wherein said operating means comprises a ring counter and a source of pulses for advancing said ring counter.

5. The apparatus of claim 4, and wherein said transient suppression means comprises a capacitor interposed in parallel between said switching means and said output circuit and actuating means for establishing a discharge circuit across said capacitor substantially concurrently with the switching of said output circuit from one input circuit to another input circuit and for thereafter interrupting said discharge circuit.

6. The apparatus of claim 5, and wherein said actuating means comprises a monostable multivibrator triggered by said pulses and having a relay for establishing and interrupting said discharge circuit.

7. A circuit interposed between a pair of input terminals and a pair of output terminals for suppression of transients at said output terminals which may be generated upon a change of signal level at said input terminals and comprising an electric charge storage device connected across said input terminals in series with a charging resistance and also connected across said output terminals, a discharging resistance connected in series with a switch across said charge storage device, and means for closing said switch substantially synchronously with a change in signal level at said input terminals and for thereafter opening said switch.

8. The circuit of claim 7, further comprising switching matrix means for connecting any one of a plurality of input circuits to said input terminals, said means for opening and closing said switch including means operated synchronously with the switches of said matrix means.

9. Multiplexer apparatus comprising a solid-state decimal ring counter, a reed relay matrix having a plurality of relays associated with the respective stages of said ring counter for connecting a corresponding plurality of input circuits to an output circuit, means for applying pulses to said ring counter for advancing the same, a transient suppression circuit interposed between said relay matrix and said output circuit, and means for operating said transient suppression circuit synchronously with the operation of said ring counter for suppressing transients which may be generated as said ring counter is advanced.

References Cited

UNITED STATES PATENTS

| | | | |
|---|---|---|---|
| 3,188,423 | 6/1965 | Glenner et al. | |
| 3,188,499 | 6/1965 | Xylander | 307—93 |
| 3,243,611 | 3/1966 | Johansson | 307—134 |
| 3,343,129 | 9/1967 | Schmitz | 340—166 |
| 3,355,710 | 11/1967 | Schubert | 340—166 |

ROBERT K. SCHAEFER, Primary Examiner

T. B. JOIKE, Assistant Examiner

U.S. Cl. X.R.

317—50; 340—166